US007594806B2

(12) United States Patent
Santin et al.

(10) Patent No.: US 7,594,806 B2
(45) Date of Patent: Sep. 29, 2009

(54) STUFFER PLUG FOR AUTOMOTIVE EXTRUDATE

(75) Inventors: Yvan Santin, Barrie (CA); A. Shahab Soltanzadeh, Stouffville (CA); Matthew Murray, Aurora (CA)

(73) Assignee: Decoma International Inc., Concord Ontario (CA)

( * ) Notice: Subject to any disclaimer, the term of this patent is extended or adjusted under 35 U.S.C. 154(b) by 613 days.

(21) Appl. No.: 10/558,821

(22) PCT Filed: May 28, 2004

(86) PCT No.: PCT/CA2004/000796

§ 371 (c)(1), (2), (4) Date: Nov. 28, 2005

(87) PCT Pub. No.: WO2004/106129

PCT Pub. Date: Dec. 9, 2004

(65) Prior Publication Data

US 2007/0007684 A1 Jan. 11, 2007

Related U.S. Application Data

(60) Provisional application No. 60/473,488, filed on May 28, 2003.

(51) Int. Cl.
*B29C 51/02* (2006.01)

(52) U.S. Cl. .................................... 425/130; 264/46.6

(58) Field of Classification Search ............... 264/46.6; 425/130
See application file for complete search history.

(56) References Cited

U.S. PATENT DOCUMENTS 3,159,886 A * 12/1964 Lynch ....................... 49/479.1
6,927,183 B1 * 8/2005 Christen ..................... 442/370

FOREIGN PATENT DOCUMENTS

DE 42 15 646 11/1993
GB 2 118 493 11/1983

* cited by examiner

*Primary Examiner*—Philip C Tucker
*Assistant Examiner*—Robert J Grun
(74) *Attorney, Agent, or Firm*—Clark Hill PLC

(57) ABSTRACT

A process and apparatus for insertion of a stuffer plug (18) within a hollow section of a automotive weatherseal extrudate (10) is provided which operates by insertion of a needlelike section (20) of a dispenser unit through a wall of the extrudate into the hollow section. A stuffer plug precursor is then injected or inserted into the hollow section and the needle-like section of the dispenser is removed. The stuffer plug precursor (22) then forms a stuffer plug (18) within the hollow section. Preferably, the stuffer plug is a two part polyurethane which reacts chemically to form a polyurethane foam stuffer plug (18) within the hollow section. An easier method for establishing a stuffer plug (18) within an extrudate (10) is provided.

7 Claims, 3 Drawing Sheets

18
14
10
12
16

20
14
12
14
16

14
20
12
14
16

14
20
14
12
16
22

14
20
12
14
16
22

14
18
12
12
14
16

63
62
50
60
52
44
44
54
42
64
12
14
46
40
40
34
10

62
44
68
66
44

STUFFER PLUG FOR AUTOMOTIVE EXTRUDATE

CROSS-REFERENCE TO RELATED APPLICATIONS

This applications claims priority of U.S. Provisional Patent Application Ser. No. 60/473,488 filed on May 28, 2003, entitled "Stuffer Injection for Automotive Extrudate".

FIELD OF THE INVENTION

The present invention relates to the field of stuffing of automotive extrudate, and in particular, relates to a device and process for inserting a stuffer plug within an extrudate.

BACKGROUND OF THE INVENTION

Extrudates are commonly used to produce materials used in automotive applications, such as, for example, in weatherseals or the like. Such weatherseals are primarily used to provide seals against wind, rain, noise and the like, in situations wherein glass and metal (or other materials) are in contact with each other (in fixed or movable situations), or in situations where metal components (or other materials) are in a movable relationship to one another, such as, for example, a door, trunk or hood opening with respect to the frame or body of the automobile.

The term "extrudate" is used since these materials are typically manufactured by extruding a selected, extrudable material through an extruder to form a continuous length of the selected material. The extruded material may then be, if necessary, cut to length, and/or bent or shaped to form the desired "extrudate" material.

By "extrudable" is meant that a material blend can be processed in an available, commercial extruder or injection moulding machine which provides internal mixing at a temperature in the range from, for example, about 180° C. to 240° C. with a residence time less than 5 min, preferably in the range from 30 sec to 2 min.

Extrudates in the automotive industry, and in particular weatherseals, are typically produced as a long, hollow ribbon of flexible material. The flexible material is chosen to enable the material to be fitted to the body of the automobile. The extrudate is commonly hollow to allow for increased flexibility, and reduce weight and costs by minimizing the amount of material used. As such, there are commonly one or more passages, or passageways, which are at least partially, and commonly, totally enclosed within the extrudate. While these passageways reduce the amount of material used, decrease weight, and allow for increased flexibility of the extrudate, it can be desirable under certain circumstances to strengthen or otherwise stiffen the extrudate material. In prior art applications, this task would commonly be achieved by inserting a pre-formed plug or "stuffer", typically made of a foamed material, into a passageway at one end of the weatherseal, and using compressed air to push or otherwise move the plug or stuffer to a desired location within an extrudate passageway.

Alternatively, the plug or stuffer might be formed in the weatherseal by insertion of a foaming material from a nozzle inserted into the passageway through one or more ends of the weatherseal, and allowing the foaming material to form a plug, in situ. While these operations provide the necessary stiffening of the weatherseal, insertion of the plug in the correct location can be difficult, and commonly involves the use of manual labour. Further, it should be noted that these operations are commonly conducted off of the production line since they are not easily automated. The costs of such "off-line" operations can be high, and as such, it would therefore be desirable to provide an alternative method for the placement of stuffers or plugs within the hollow shell and/or passageways formed within the shell of the extrudate. It would also be advantageous to provide an alternative method which could be automated and which would be suitable for "on-line" processes.

SUMMARY OF THE INVENTION

Accordingly, it is a principal advantage of the present invention to provide a process for the direct insertion of a plug into a passageway within a hollow automotive extrudate.

It is a further advantage of the present invention to provide an automated device and process for the direct insertion of such a plug into the automotive extrudate.

The advantages set out hereinabove, as well as other objects and goals inherent thereto, are at least partially or fully provided by the process of the present invention, as set out herein below.

Accordingly, in one aspect, the present invention provides a process for producing an extrudate having at least one stuffer plug comprising providing an extrudate having at least one hollow section within said extrudate; piercing said extrudate and inserting an operative end of a dispenser within said hollow section; inserting or injecting, through said dispenser, a stuffer precursor within said hollow section; removing said dispenser from said hollow section; and allowing said stuffer precursor to form a stuffer plug.

In a further aspect, the present invention also provides extrudate produced from a process as described hereinabove.

In a still further aspect, the present invention also provides an apparatus for establishing a stuffer plug within a hollow section of an extrudate, which apparatus comprises a dispenser having a needle-like section and a stuffer plug precursor supply means for supplying precursor material to said dispenser, wherein the needle-like section is capable of being at least partially inserted, through the wall of the extrudate, into a hollow section within the extrudate so that a stuffer plug precursor material can be fed through the needle-like section of said dispenser unit into the hollow section.

In a still further aspect, the present invention also provides for the use of an extrudate comprising a stuffer plug which has been established within the extrudate using a process as described hereinabove with respect to the present invention.

In a still further aspect, the present invention also provides an extrudate having a substantially hollow section surrounded by a shell, said extrudate comprises a stuffer plug within the hollow section, said stuffer plug being disposed about a pierced section of the shell.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figures 1, 2A, 2B, 2C, 2D, 2E:
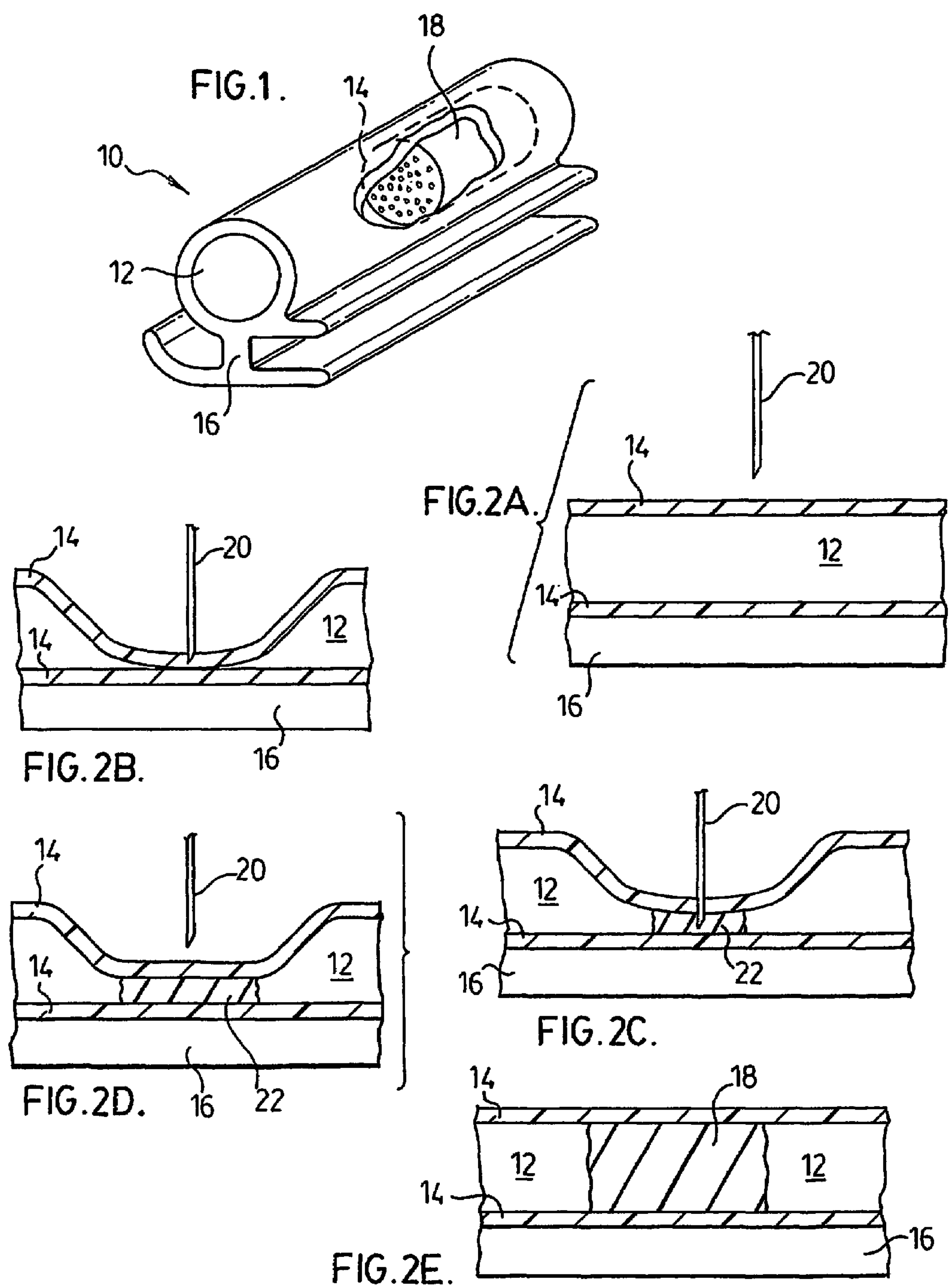
FIG. 1 is a perspective view of an extrudate weatherseal component with a cutaway section showing a stuffer plug within a closed passageway.
FIGS. 2A-2E show a series of schematic cross-sectional views of a stuffer plug being created within an extrudate, in accordance with the present invention.

The novel features which are believed to be characteristic of the present invention, as to its structure; organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention.

Referring to FIG. 1, an extrudate weatherseal 10 is shown having a rubber shell 14. Extrudate 10 is produced in continuous fashion by extrusion, and then cut to length. In the present application, the term "extrudate" refers to any product produced by extrusion of an extrudable material. The term "weatherseal" refers to a product used for sealing between surfaces, and in particular, to an extruded thermoplastic material intended for use in any application where metal and/or glass parts. The present application is primarily directed to, and described with respect to, the use of such extrudates as weatherseals for automobiles. However, the skilled artisan will be aware that such extrudates can be used in a wide variety of automotive applications. Further, while the present application is described with particular reference to the automotive industry, the skilled artisan would be aware that the present application is equally applicable in other non-automotive applications.

The extrudate weatherseal 10 is formed with at least one hollow section, which hollow section is typically a passageway extending along the length of the extrudate, and which is at least partially enclosed within the extrudate. Most preferably, the passageway is substantially completely enclosed within the extrudate (with the possible exception of the ends of the passageway and/or extrudate). While the extrudate typically has only one passageway, it can, in some circumstances, comprise a plurality of passageways within a single extrudate.

The extrudate weatherseal 10 is preferably a material which has been found to be suitable for use as a weatherseal for automotive applications. A wide variety of weatherseal materials have been proposed and used, including rubber, synthetic rubber, rubberized materials, plastics, elastomers and the like. A typical weatherseal might be fabricated of, for example, elastomers, which can be defined as a material which experiences large reversible deformations under relatively low stress. Some examples of commercially available elastomers include natural rubber, ethylene/propylene (EPM) copolymers, ethylene/propyleneldiene (EPDM) copolymers, styrene/butadiene copolymers, chlorinated polyethylene, and silicone rubber.

Thermoplastic elastomers are elastomers having thermoplastic properties. That is, thermoplastic elastomers are optionally molded or otherwise shaped and reprocessed at temperatures above their melting or softening point. One example of thermoplastic elastomers is styrene-butadiene-styrene (SBS) block copolymer. SBS block copolymers exhibit a two phase morphology consisting of glassy polystyrene domains connected by rubbery butadiene segments. At temperatures between the glass transition temperatures of the butadiene mid-block and the styrene end-blocks the SBS copolymers act like a crosslinked elastomer.

In contrast, thermoset elastomers are elastomers having thermoset properties. That is, thermoset elastomers irreversibly solidify or "set" when heated, generally due to an irreversible crosslinking reaction. Two examples of thermoset elastomers are crosslinked ethylene-propylene monomer rubber (EPM) and crosslinked ethylene-propylene-diene monomer rubber (EPDM). EPM materials are made by copolymerization of ethylene and propylene, and are typically cured with peroxides to give rise to crosslinking, and thereby induce thermoset properties. EPDM materials are linear interpolymers of ethylene, propylene, and a non-conjugated diene such as 1,4-hexadiene, dicyclopentadiene, or ethylidene norbornene. EPDM materials are typically vulcanized with sulfur to induce thermoset properties, although they alternatively are optionally cured with peroxides.

Additional materials include materials commonly referred to as thermoplastics and more particularly to "thermoplastic vulcanizates" (TPVs), and even more particularly to weatherseals made from extrudable TPVs.

Thermoplastic vulcanizates (TPVs) are polyolefinic matrices, preferably crystalline, through which thermoset elastomers are generally uniformly distributed. Examples of thermoplastic vulcanizates include EPM and EPDM thermoset materials distributed in a crystalline polypropylene matrix. One example of a commercially available material is Santoprene™. Thermoplastic rubber which is manufactured by Advanced Elastomer Systems and is a mixture of crosslinked EPDM particles in a crystalline polypropylene matrix. These materials have found utility in many applications which previously used vulcanized rubber, e.g. hose, gaskets, and the like. In these applications, TPVs are noted for their ability to be processed as thermoplastics while retaining the excellent tensile and compression set properties of vulcanized rubbers.

Commercial TPV materials are typically based on vulcanized rubbers in which a phenolic resin or sulfur cure system is used to vulcanize, that is to crosslink, a diene copolymer rubber by way of dynamic vulcanization, that is crosslinking while mixing (typically vigorously), in a thermoplastic matrix. Sulfur or a phenolic resin is preferred over peroxide free radical cure systems because peroxide degrades a polypropylene or and crosslinks a polyethylene as well as the rubber and this is in turn limits the extent of rubber crosslinking that can occur before the entire mixture degraded or crosslinked and is no longer thermoplastic.

The thermoplastic material of use in the present invention, is preferably extrudable, and thus forms a thermoplastic extrudate. The thermoplastic extrudate is preferably a solid material which is essentially free of macroscopic voids, or alternatively, is a dense foam material having a density in the range greater than about 80% of that of the solid material. It should be noted, however, that the thermoplastic material of interest in the present invention is typically re-processable, unlike a thermoset resin.

Other materials for blending or co-extrusion can include, for example, melt-blended olefin-based elastomers including polypropylene, polyethylene. Other components can include plasticizers, viscosity modifiers such as processing oils or esters, fillers, colourants, curing agents, antioxidants and other ingredients. Suitable fillers can include calcium silicate, clay, kaolin, talc, silica, diatomaceous earth, powdered mica, barium sulfate, aluminum sulfate, calcium sulfate, basic magnesium carbonate, glass fibers, and carbon fibers, provided the filler is used in an amount small enough not to adversely affect either the hardness or the coefficients of friction of the thermoplastic copolymer.

The components of the weatherseal 10 are preferably selected so as to provide acceptable weatherseal properties with respect to, for example, known weatherseal performance properties such as flexibility, durability, hardness, UV resistance, and the like. The cross-section of the body is preferably adapted to be held in or on a particular portion of an opening which is to be sealed against the weather.

Through the use of appropriate materials, a weatherseal can be produced which provides good weatherseal properties such as softness, abrasion resistance and low coefficients of friction. Further, by varying the ratios of the components, one may provide desired hardness/softness, oil and temperature resistance, oxidation resistance, and extrudability, inter alia. Additionally, by fabricating a hollow extrudate, the weight of the weatherseal is reduced, and typically, its flexibility is increased.

It should be clear that the process and apparatus of the present invention are of most use wherein the hollow section of the weatherseal is essentially completely surrounded by the extruded material (with the possible exception of the extrudate ends), and thus is essentially closed. While there may be applications wherein the process of the present invention is used with an open extrudate (i.e. one that is not essentially closed), it will be clear to the skilled artisan that the primary advantage of the device and process of the present invention is to provide a plug of material within the closed extrudate, and thus close and/or seal any or all passageways within the extrudate.

During production, a closed passageway 12 is created which is a hollow section within shell 14, together with a solid rubber section 16 which is adapted to be fitted over a metal strip and rest against an adjacent metal strip (not shown). A portion of shell 14 has been cutaway in order to reveal a foam stuffer plug 18 which is situated within passageway 12, and acts as a barrier within passageway 12 as well as a reinforcement for shell 14.

The stuffer plug 18 can be located at any point along the length of the extrudate weatherseal 10, as desired. The length of the plug 18 will vary depending on, inter alia, the amount of stuffer precursor used, and the size of the hollow section. The precursor is any material which is capable of being inserted or injected into the hollow section which can form into a plug. As such, the precursor might be a compressed foam material which will expand once inserted into the hollow section. Alternatively, the precursor might be a melted material injected into the hollow section which would solidify on cooling in order to form the stuffer plug. If needed, the extrudate weatherseal 10 could be temporarily crimped or sealed in order to contain any liquid within the desired area of the hollow section of the extrudate 10. Most preferably, however, the precursor is a material which will undergo a chemical reaction once inserted or injected into the hollow section, and thus form a plug material as a result of the chemical reaction.

Once inserted, the precursor expands by de-compression, chemical or physical foaming, or as a result of any other chemical or physical property, in order to form a stuffer plug 18. The stuffer plug 18 can, if desired, expand to fill the entire cross-sectional area of the hollow section of the extrudate 10, at or near the point of insertion of the dispenser, or can be left to only partially fill this area.

The plug 18 is preferably made from a flexible material which can bend and/or flex as the extrudate bends, flexes, or otherwise moves. Further, while any suitable material might be used, preferably the plug material does not significantly react with, adhere to, or otherwise affect the surface of the extrudate material. As such, the plug is preferably manufactured from a polyurethane foam, and most preferably, from a two part polyurethane material which reacts within the passageway to form a foam plug material. As such, the plug 18 preferably is a foam material, which foam is preferably formed in situ by a chemical reaction of the plug material within the extrudate 10.

In FIGS. 2A-2E , schematic cross-sectional views of the method for production of a foam stuffer plug 18 are shown in 5 stages. In FIG. 2A, a needle-like dispenser unit 20 is shown above an extrudate having a hollow shell 14 around a passageway 12. In FIG. 2B, dispenser unit 20 has been moved to pierce shell 14 which collapses as a result of the pressure from unit 20. However, the dispenser unit 20 has pierced shell 14. In FIG. 2C, a two-part polyurethane material 22 as a stuffer plug precursor, which was mixed immediately prior to being fed to dispenser unit 20, is being injected into collapsed shell 14. In FIG. 2D, dispenser unit 20 is removed from shell 14, and the complete charge of polyurethane material 22 has been injected into shell 14. Material 22 sticks to the inner sides of shell 14 and maintains the shell in a partially collapsed shape.

In FIG. 2E, material 22 has reacted and thereby expanded to form a foam stuffer plug 18 from precursor material 22, and the stuffer plug 18 separates shell 14 into two separate hollow passageways 12. Any further force on shell 14 in the region of the stuffer plug, will now act against both the extrudate shell, and the stuffer plug.

Figure 3:
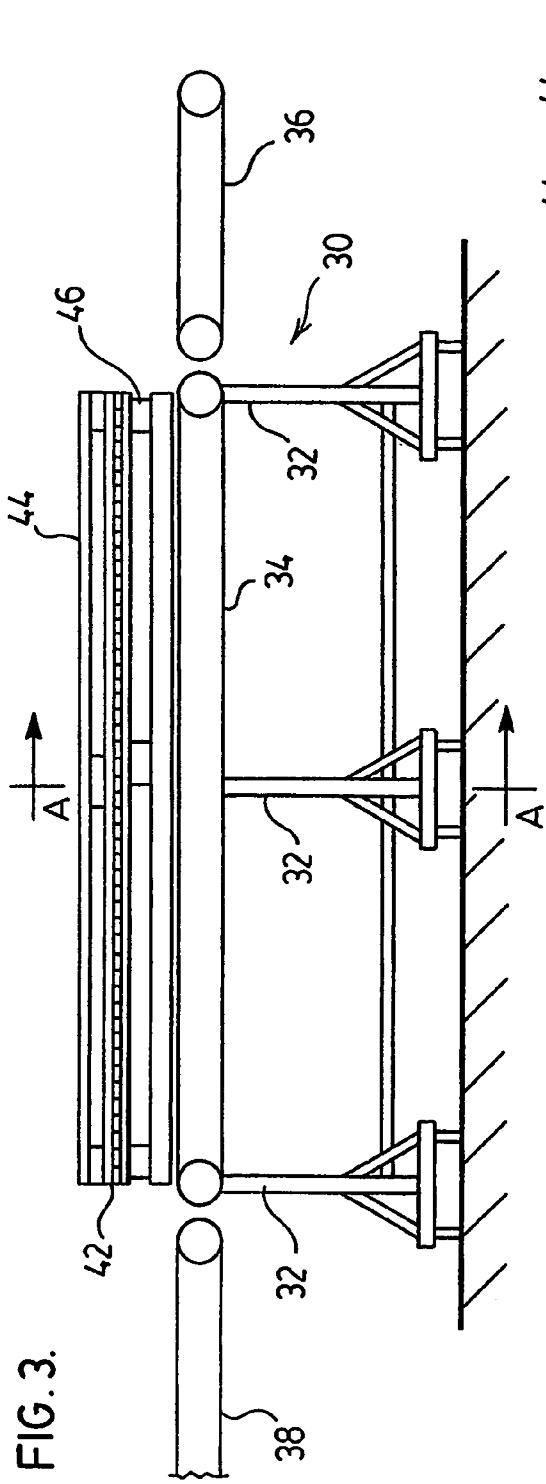
FIG. 3 is a front view of a work station for using an apparatus for injection of a stuffer plug within an extrudate.
Figure 4:
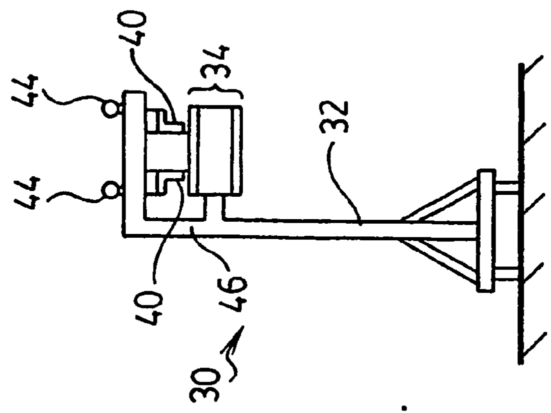
FIG. 4 is a side view of Section A-A of the apparatus of FIG. 3.

In FIG. 3, a front view of a work station 30 for using an apparatus to inject a stuffer plug into an extrudate, as shown in FIGS. 2A-2E, is provided. FIG. 4 provides a cross-sectional view of work station 30, along the line A-A in FIG. 3. Work station 30 is supported by a series of stands 32 on which rests a conveyor 34. A length of extrudate 10 lies on conveyor 34. Extrudate 10 has been fed to conveyor 34 using conveyor 36, and when stuffer plug 18 has been inserted, extrudate 10 will be removed using conveyor 38. Extrudate 10 is held in position on conveyor 34 using a set of alignment rails 40. A measuring tape 42 is provided in order to locate dispenser unit 62 (best seen in FIG. 5) in the proper position. Guide rails 44 are provided for moving the dispenser unit 62 and its related assembly 60. A support bracket 46 is provided for attaching alignment rails 40 and guide rails 44 to support stands 32.

Figure 5:
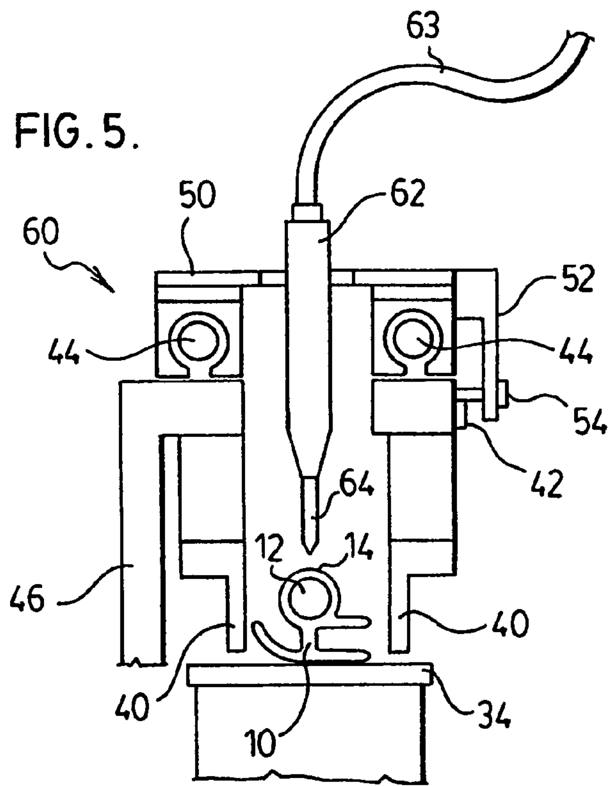
FIG. 5 is sectional view of the injection unit shown in place in the apparatus of FIG. 3.
Figure 6:
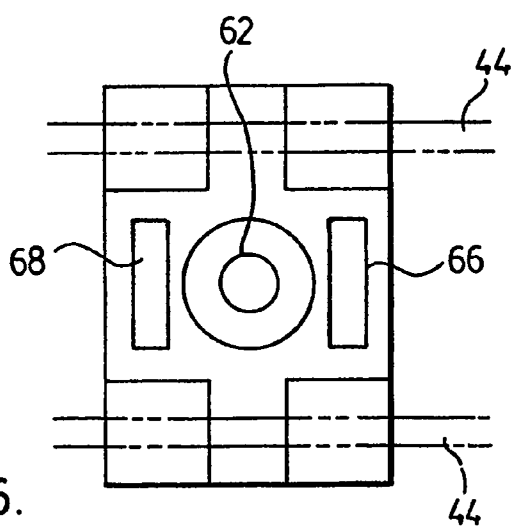
FIG. 6 is a top view of the injection unit shown in FIG. 5.

In FIGS. 5 and 6, a sectional view and a top view, respectively, of details of dispenser unit assembly 60 are provided. The dispenser 60 is preferably a needle-like assembly which can pierce the extrudate wall without causing any significant damage to the outer surface of the extrudate. Dispenser unit 62 is attached to injection unit stand 50, which in turn is attached to positioning bracket 52 which bracket slides along guide rails 44. A stop pin 54 is provided on the front of bracket 52 and is located next to measuring tape 42. Stop pin 54 can be used to "lock" unit 60 in place when the dispenser unit is being used.

At the lower end of dispenser unit 62 is a needle 64 to pierce the extrudate wall and through which the stuffer plug precursor material can be fed. Dispenser unit 62 is shown in FIG. 5 in its upward position, and is raised above extrudate 10. Extrudate 10 is held in position by alignment rails 44, and rests on conveyor 34.

The dispenser 60 may be a single hollow needle, or might comprise two or more needle sections in the case of a chemical reaction wherein the chemical components are kept separate from each other until mixing in the extrudate passageway. Alternatively, the chemical components might be pre-mixed shortly prior to insertion or injection into the hollow section of the extrudate.

The dispenser 60 might be a hand-held device operated by a manual operator and might merely comprise a needle-like section connected to a stuffer plug precursor material supply. Preferably, however, the dispenser 60 is one part of a dispenser assembly which includes an extrudate channel for holding a length of extrudate 10 in position within the apparatus, a needle-like assembly for piercing the extrudate wall, when in an operative position, so as to be capable of inserting or injecting a stuffer precursor within a hollow section of the extrudate 10, and dispenser unit actuators adapted to move the needle-like section of the dispenser to and from the operative position to an inoperative position wherein the needle-like assembly is withdrawn from the extrudate 10. The dispensing apparatus 60 might also be movable and include means for locating the dispenser at a desired location on the extrudate.

As such, the dispenser 60 may be part of a dispenser assembly, which dispenser assembly comprises alignment rails 40 for positioning and holding an extrudate 10 in an operative position, guide rails 44 on which said dispenser is mounted and on which guide rails. The dispenser 60 can be moved by actuators for moving the dispenser 60 from a retracted position where it is not in contact with the extrudate 10 to, and from, an extended position wherein the needle-like section pierces a wall of the extrudate 10 and at least a part of the needle-like section extends into a hollow section within extrudate 10.

Preferably, the guide rails 44 are essentially parallel to the alignment rails 40 so that the dispenser unit can be moved along the length of the extrudate 10 held within the alignment rails 40.

Also, preferably the dispenser assembly 60 comprises at least one conveyor 34 for moving a length of extrudate 10 into an operative position within the alignment rails 40. The conveyor 34, such as a conveyor belt, can also be used to reposition the extrudate 10 within the rails in order that the dispenser unit can establish two or more stuffer plugs 18 within the extrudate 10.

The assembly for controlling the dispensers, the conveyer, dispenser actuators, and the like, can be controlled by various processors so that the apparatus is automated. As such, the assembly can automatically determine and move the extrudate 10 to the proper location for insertion or injection of the stuffer plug 18 within the extrudate 10, and be able to move the dispenser to an appropriate position for insertion into the extrudate 18.

Using a downstroke cylinder 66, dispenser unit 62 is moved downwards and pierces shell 14 of extrudate 10, in a manner described in FIGS. 2A-2E. Stuffer plug precursor material is fed to dispenser unit 62 through supply hose 63. Once the stuffer plug precursor material has been injected into hollow passageway 12, dispenser unit 62 is again raised above extrudate 10 using upstroke cylinder 68. Conveyor 34 can then be used to move extrudate 10 along the work station, or to be removed from work station 30.

It will be understood that work station 30 might have one, or a plurality of dispenser units 62 each of which might be activated simultaneously, or in sequential order. It will also be understood that the devices of the present embodiment can be controlled by a variety of processing units (not shown), and thus, movement of the extrudate and injection of the stuffer plug material can be automated so as to eliminate or reduce the need for manual, off-line processing.

Thus, it is apparent that there has been provided, in accordance with the present invention, a process and apparatus for producing extrudate materials, and in particular weatherseal extrudates, which comprise a stuffer plug which has been inserted or injected into the extrudate, and an apparatus for conducting the process, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

What is claimed is:

1. An apparatus for the on-line process of introducing a stuffer plug within the hollow section of an elongated, hollow extrudate, said apparatus comprising:

a stand having a support bracket for positioning said apparatus relative to the extrudate;

a pair of elongated, spaced apart and parallel guide rails supported by said support bracket;

a dispenser assembly operatively coupled to said guide rails for movement along said guide rails to position said dispenser assembly along the length of the extrudate, said dispenser assembly including needle section operable between a retracted position spaced from the extrudate and an extended position piercing a portion of the extrudate to introduce the stuffer plug therein; and a pair of spaced apart alignment rails supported by said support bracket and parallel to said guide rails for positioning and aligning the extrudate with said dispenser assembly for engagement by said needle section in said extended position to selectively introduce the stuffer plug into the extrudate.

2. An apparatus as claimed in claim 1 wherein said dispenser assembly further includes dispenser unit for supporting and selectively positioning said needle section between said extended and retracted positions.

3. An apparatus as claimed in claim 2 wherein said dispenser assembly further includes a supply device for supplying stuffer plug material to said dispenser unit and needle section for introduction into the extrudate.

4. An apparatus as claimed in claim 3 wherein said dispenser unit includes an upstroke cylinder for moving said needle section to said extended position and a downstroke cylinder for moving said needle section to said retracted position.

5. An apparatus as claimed in claim 4 further including a conveyor assembly for supporting and supplying a length of the extrudate into an operative position within said alignment rails for introduction of the stuffer plug by said dispenser assembly.

6. An apparatus as claimed in claim 5 wherein said dispenser assembly includes a plurality of dispenser units.

7. An apparatus as claimed in claim 5 wherein said dispenser assembly includes a plurality of needle sections for piercing multiple portions of the extrudate to introduce a stuffer plug therein.

* * * * *